United States Patent Office 2,719,316
Patented Oct. 4, 1955

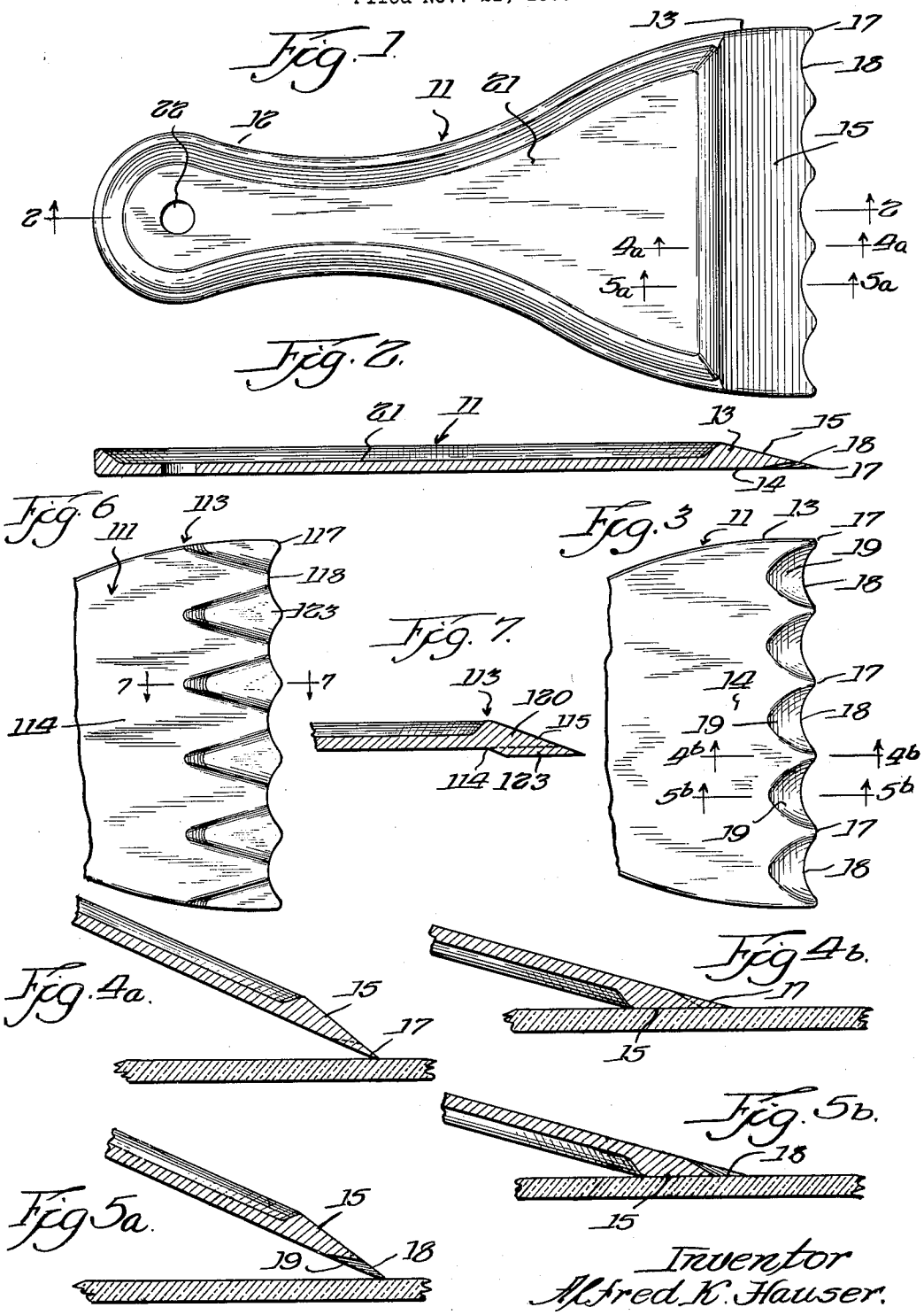

2,719,316

CHOPPING AND SCRAPING INSTRUMENT

Alfred K. Hauser, Chicago, Ill.

Application November 21, 1950, Serial No. 196,761

3 Claims. (Cl. 15—236)

The present invention relates to a scraping instrument, and more particularly to a single instrument comprising a combination chopper and scraper for use in cleaning ice off automobile windshields, and the like.

The formation of ice and frost on the windshields of automobiles during cold weather presents one of the greatest traffic hazards of the present day. Quite often a layer of ice is extremely difficult to remove if it adheres to the surface of the glass strongly, as it will if the glass was originally clean at the time the ice formed upon it. Under such circumstances, automobile owners do use their automobiles without first removing the layer of ice. This is due to the fact that instruments for removing ice heretofore available have not proven satisfactory because they slide over the top surface of the ice rather than cutting under it. Consequently, the automobile drivers quite often choose to leave the ice on the windshield rather than go to the trouble of removing it. It is therefore one object of the present invention to provide an improved scraping instrument.

Another object of the invention is to provide a single instrument capable of use as both a chopper and scraper for easily removing an undesired covering from a surface, such as ice formed on the windshield of an automobile.

A feature of the invention is the provision of a scraping instrument consisting of a body having a cutting edge portion composed of a pair of intersecting surfaces. One of the pair of surfaces is planar, and is tapered from the normal thickness of the body so as to intersect the plane containing the body at a relatively small acute angle and form a cutting edge. The cutting edge thus formed has a plurality of serrations therein, with both the ridge and valley portions of the serrations having a sharp cutting edge.

Many other objects, features, and advantages of the construction herein shown and described will be obvious to those skilled in the art from the disclosure herein given when considered in connection with the accompanying drawings, wherein like reference characters indicate like or corresponding parts:

Fig. 1 is a top plan view of a scraping instrument comprising a preferred form of the invention;

Fig. 2 is a side sectional view of the instrument shown in Fig. 1;

Fig. 3 is a partial bottom plan view of the instrument shown in Fig. 1;

Fig. 4a is a fragmentary sectional view of the instrument shown in Fig. 1 taken through plane 4a—4a, and showing the manner in which the ridge portions of the serrated edge of the instrument operate on a surface during the chopping action;

Fig. 4b is a fragmentary sectional view taken through plane 4b—4b of Fig. 3, and showing the manner in which the ridge portions of the serrated cutting edge operate during the scraping action of the invention;

Fig. 5a is a fragmentary sectional view taken through plane 5a—5a of Fig. 1, and showing the manner in which the valley portions of the scraper edge operate during chopping action;

Fig. 5b is a fragmentary sectional view taken through plane 5b—5b of Fig. 3, and showing the manner in which the valley portions of the instrument operate during scraping action;

Fig. 6 is a fragmentary bottom plan view of the cutting edge of a second form of the invention, the remainder of the body portion of the instrument being substantially identical to the instrument shown in Fig. 1; and Fig. 7 is a side sectional, inverted view of the form of invention shown in Fig. 6 taken through plane 7—7.

Referring now to Fig. 1 of the drawings, the combination chopping and scraping instrument comprising the invention includes an integral, relatively thin, broad, paddle-shaped body 11 having a handle portion 12 and cutting edge portion 13. As is shown in Fig. 2, the cutting edge portion 13 of the scraper consists of a pair of intersecting surfaces 14 and 15, the surface 14 preferably lying substantially parallel to the plane containing body 11, and the surface 15 being tapered from the normal thickness of the body so as to intersect the plane containing body 11, and therefore surface 14, at a relatively small acute angle. As is best seen in Figs. 1 and 3, the thin cutting edge formed by the intersection of surfaces 14 and 15 has a plurality of serrations therein, said serrations consisting of ridged portions 17 and valley portions 18. Coinciding with the valley portions 18 of the serrations are a plurality of grooves 19 formed in surface 14 and shaped in such a manner that the valley portions 18, as well as the ridge portions 17 of the serrations, present a fine cutting edge. In contrast to the irregularity of surface 14, the surface 15 is planar so that it presents a smooth, outer face that is tapered with respect to the plane of the scraper body in the fashion best seen in Figs. 4b and 5b of the drawings.

The scraper is preferably constructed of a molded plastic material but, if desired, can be made out of wood, steel, or any other suitable material. The interior portion 21 of the body 11 is of thinner construction than the outline areas, and the cutting edge portion 13 thereof, so as to economize on the material used in making the instrument, and as a matter of convenience, a small aperture 22 is provided in the handle portion 12 so that the instrument may be deposited on a hook, or the like, when not in use.

Referring now to Figs. 4a, 4b, 5a, and 5b of the drawings, the prescribed manner in which the instrument is utilized to clean a surface, such as an iced windshield, is illustrated. As is shown in Fig. 4a, the scraper is first turned top side up so that the ridge portions 17 of the serrated cutting edge engage the surface being cleaned in a tooth-like fashion. The scraper is then vigorously moved back and forth over the surface so as to chop or cut ridges in the ice formed thereon. During this action, the ice tending to pile up on the leading edge of the ridge portions is allowed to move between the open areas defined by the valley portions 18 of the serrations and the grooves 19 in surface 14, best shown in Fig. 5a. The scraper is then turned over so as to present the smooth, tapered, plane face 15 to the iced surface in the manner shown in Figs. 4b and 5b, and again vigorously moved back and forth, exposing the ice, which has been loosened by the original chopping action, to a scraping action. During this action, as is apparent from Figs. 4b and 5b, both the ridge and valley portion 17 and 18 of the scraper present a fine cutting edge to the ice so that the entire area covered by the breadth of cutting portion 13 is scraped clean.

From the above description it can be appreciated that the invention provides a single instrument having a serrated or toothed cutting edge designed in such a fashion that the instrument can first be used to chop or loosen the undesired covering on a surface, such as ice, and can then be used to scrape the surface clean. Thus an effective cleaning of the surface can be accomplished with only one instrument.

Adverting next to Fig. 6 of the drawing, a second embodiment of the instrument comprising the invention is shown. This embodiment has a body 111 which is substantially identical in construction to that shown in Figs. 1 and 3, and which includes a cutting edge portion 113. Cutting edge portion 113 consists of a pair of intersecting surfaces 114 and 115, and has a plurality of serrations therein consisting of ridge portions 117 and valley portions 118. Surface 114 has a plurality of raised ridges 123 formed thereon which coincide with the ridge portions 117 of the serrations, and surface 115 is planar and tapered from the normal thickness of the body of the instrument so as to intersect a plane substantially parallel to the plane containing the body at a small acute angle and thereby form a cutting edge. The cutting edge thus formed is so designed that both the ridge and valley portions of the serrations therein present a sharp cutting edge. The operation of the form of the invention shown in Figs. 6 and 7 is similar in every way to that shown in Fig. 1, and therefore will not be described. As it may prove desirable in certain instances to utilize the ridge construction illustrated in Figs. 6 and 7, rather than the construction shown in Fig. 1, it has been described.

From the foregoing description of the invention, it can be appreciated that the invention provides a novel, single instrument capable of use as both a chopper and a scraper for easily cleaning an undesired covering from a surface with a minimum of effort.

Having thus described my invention, it is obvious that various immaterial modifications may be made in the same without departing from the spirit of my invention; hence, I do not wish to be understood as limiting myself to the exact form, construction, arrangement, and combination of parts herein shown and described, or uses mentioned.

What I claim as new and desire to secure by Letters Patent is:

1. A scraper primarily adapted for removing ice incrustations from surfaces, comprising a relatively thin, substantially rigid, flat, paddle-shaped member providing a scraper body and handle, said body being provided with flat faces and having a rigid scraper end of toothed form, the teeth of said end having their operative scraping ends terminating in lateral straight alignment and being defined upon one face of the body by ridges of transversely curved profile upstanding from said one face and forming a rigid part thereof, said ridges terminating at said end and merging into said one face remote from said end and providing between them spaces through which, when the scraper is in use with said ridged face against the ice, chipped ice may pass between the ice incrusted surface and the scraper body, the opposite face of said end being a planar surface capable of relatively flat contact with such ice incrusted surface, whereby when the ridged face of said end is moved over the ice incrustation the ice may be unobstructedly chipped therefrom, and when the opposite planar surfaced face of said end is moved over the ice incrusted surface the ice may be shaved therefrom.

2. A scraper primarily adapted for removing ice incrustations from surfaces, comprising a relatively thin, substantially rigid, flat, paddle-shaped member providing a scraper body and a handle, said body being provided with flat faces and having a rigid scraper end of toothed form, the teeth of said end being defined upon one face thereof by ridges of transversely curved profile upstanding from said one face and forming a rigid part thereof, said ridges terminating at said end and merging into said one face remote from said end providing between them spaces through which, when the scraper is in use with said ridged face against the ice, chipped ice may pass between the ice incrusted surface and the scraper body, the opposite face of said end being a planar surface lying at an acute angle to said flat faces and being capable of relatively flat contact with such ice incrusted surface, whereby when the ridged face of said end is moved over the ice incrustation the ice may be unobstructedly chipped therefrom, and when the opposite planar surfaced face of said end is moved over the ice incrusted surface the ice may be shaved therefrom.

3. A scraper as claimed in claim 2, in which said one face of said end is formed as a co-planar continuation of one flat face of the body.

References Cited in the file of this patent

UNITED STATES PATENTS

| Number | Name | Date |
|---|---|---|
| D. 156,638 | Lifshutz et al. | Dec. 27, 1949 |
| 189,196 | Crawford | Apr. 3, 1877 |
| 481,104 | Clow | Aug. 16, 1892 |
| 850,582 | Horton | Apr. 16, 1907 |
| 1,377,484 | Huneryager | May 10, 1921 |
| 1,432,798 | Spence | Oct. 24, 1922 |
| 1,895,055 | Steinour et al. | Jan. 24, 1933 |
| 2,277,528 | Osborn | Mar. 24, 1942 |
| 2,519,946 | Voelker et al. | Aug. 22, 1950 |
| 2,536,311 | Rojakovick | Jan. 2, 1951 |

FOREIGN PATENTS

| 929,689 | France | July 15, 1947 |